United States Patent [19]

Maxwell

[11] 4,446,892
[45] May 8, 1984

[54] METHOD AND APPARATUS FOR MONITORING LENGTHS OF HOSE

[75] Inventor: Anthony J. Maxwell, Monte Carlo, Monaco

[73] Assignee: Maxwell AG, Oberwil, Switzerland

[21] Appl. No.: 183,716

[22] Filed: Sep. 3, 1980

[30] Foreign Application Priority Data

Sep. 5, 1979 [GB] United Kingdom ............... 7930712

[51] Int. Cl.³ .......................................... G01M 3/28
[52] U.S. Cl. ................................. 138/104; 116/227; 116/DIG. 7
[58] Field of Search ................ 138/104; 116/DIG. 7, 116/227, 204

[56] References Cited

U.S. PATENT DOCUMENTS 2,759,175  8/1956  Spalding ........................... 138/104

FOREIGN PATENT DOCUMENTS 54-69822  6/1979  Japan ............................... 138/104
2005036   4/1979  United Kingdom .

Primary Examiner—Steven L. Stephan
Attorney, Agent, or Firm—Learman & McCulloch

[57] ABSTRACT

A fluid transport hose having two or more plies comprising a sensing element located between the plies, the sensing element being responsive to the electromagnetic properties of fluid between the plies as a result of a rupture of the inner ply. Alternatively, the sensing element may be adapted to respond to the failure of an inner ply of the hose by presenting an open circuit.

7 Claims, 4 Drawing Figures

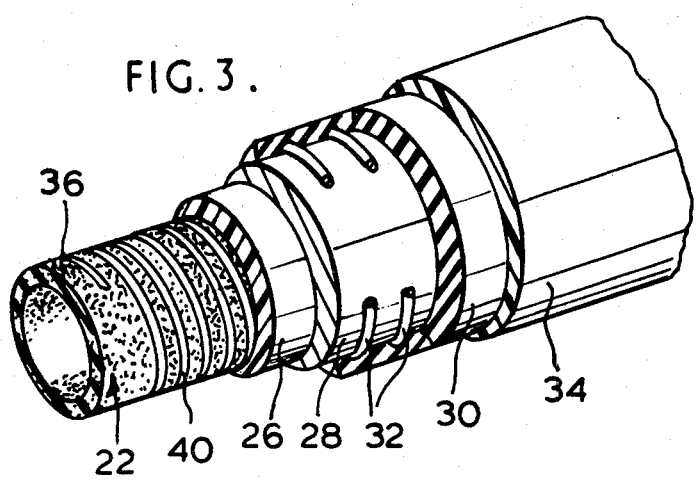
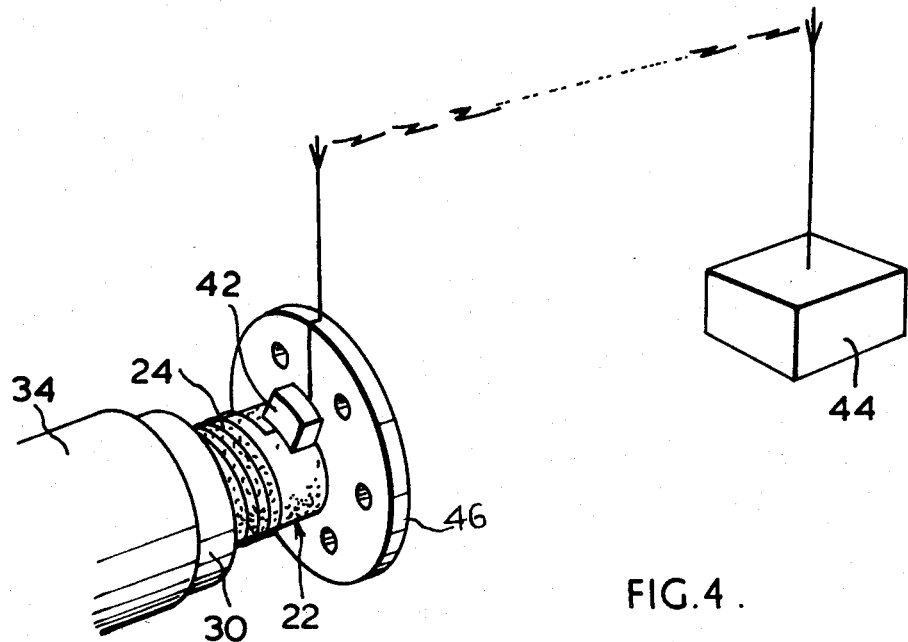

METHOD AND APPARATUS FOR MONITORING LENGTHS OF HOSE

BACKGROUND OF THE INVENTION

The present invention relates to the monitoring of lengths of hose and is particularly applicable to the monitoring of flexible heavy duty hoses used to transfer oil at sea. Such hoses are known as fluid transport hoses.

It is often necessary to load and discharge crude oil at sea due to problems of berthing large ocean going tankers alongside shore facilities in shallow waters.

A Single Buoy Mooring system is generally used for this purpose where for example oil is conveyed through steel sub surface pipelines from onshore storage or pumping facilities to a point on the sea bed under the surface floating buoy.

Flexible submarine hoses connect from the fixed pipeline via the buoy through floating hoses on the surface to a "pick-up" point which is connected, as required, to the tanker manifold. Both the submarine and floating hose sections comprise individual sections bolted together as required.

It is a problem in such a system of loading and unloading tankers that in the event of one of the hose sections, of which there are several, breaking, oil will leak out and cause pollution. In order therefore to avoid environmental pollution, it is desirable to detect imminent leakage of oil from a hose section prior to its occurrence so as to enable the hose section to be replaced.

If ample warning is provided by the detection system there would be substantial savings in costly, and frequent hose inspection procedures, and the down time of the oil pumping apparatus may be kept to a minimum. That is to say to the time necessary for the physical replacement of the hose section.

If on the other hand leakage has already commenced, then the down time will necessarily be significantly longer coupled with the risk of penalties imposed by third parties.

SUMMARY OF THE INVENTION

With a view to enabling early detection of imminent breakdown of a hose section, the present invention in one aspect provides a fluid transport hose having two or more plies comprising a sensing element located between the plies of the hose, the sensing element being responsive to the electromagnetic properties of fluid present between the plies as a result of a failure of an inner ply of the hose.

It is believed that in some cases of rupture, the mechanism involves initially the formation of a mushroom or bubble in or along the inner ply of the hose, deforming the inner wall of the hose in a manner to obstruct the flow of oil. This obstruction will result in considerable heat generation and eventually in the tearing of the mushroom from the inner ply of the hose. Such a fault presents the problem that once the inner ply has ruptured, the extent of leakage is such that the outer plies cannot contain the leakage for much longer. It is therefore desirable in such forms of rupture to detect the fault prior to seepage of oil between the plies.

In accordance with a second aspect, the invention provides a fluid transport hose having two or more plies comprising a sensing element located between the plies, the sensing element being adapted to respond to the failure of an inner ply of the hose by presenting an open circuit.

Preferably, the sensing element is comprised of a coil of fine wire wrapped around the inner ply and connected to means which are responsive to a change in the electrical impedance of the coil. In the event of oil seepage, the inductance of the coil will be changed by virtue of the change in the magnetic properties of the material immediately contacting the coil and in the event of deformation of the inner plies this will change the inductance of the coil but may additionally cause rupture of the coil resulting in an open circuit.

Alternatively, however, the sensing element may be in the form of parallel non-touching wires connected to means responsive to a change in conductance between the individual wires or to a change in the capacitance between the wires.

If desired, the sensing element may be in the form of conductors printed onto a flexible backing which is wrapped between the plies or may comprise similarly disposed sheets of aluminium foil.

In a further alternative form the sensing element may comprise a magnetic tape connected to means responsive to a change in a radio frequency signal carried by the magnetic tape.

When considering the detection of deformation of an inner ply of a hose, a further advantageous embodiment of the sensing element involves the use of a fibre optic element.

If desired, a sensing element may additionally be installed between the outermost plies of the hose in order to sense physical damage to the outer plies of the hose as caused for example by collision with a vessel.

BRIEF DESCRIPTION OF DRAWINGS

The invention will now be described further, by way of example, with reference to the accompanying drawings, in which:

FIGS. 2 and 3 show a section of a hose forming part of the pipeline shown in FIG. 1, the hose section being cut away to illustrate the composite structure of the hose, and FIG. 4 shows a section of hose broken away to illustrate its composite structure and diagramatically illustrates a radio link between the hose and a monitoring unit.

DESCRIPTION OF PREFERRED EMBODIMENTS

Figure 1:
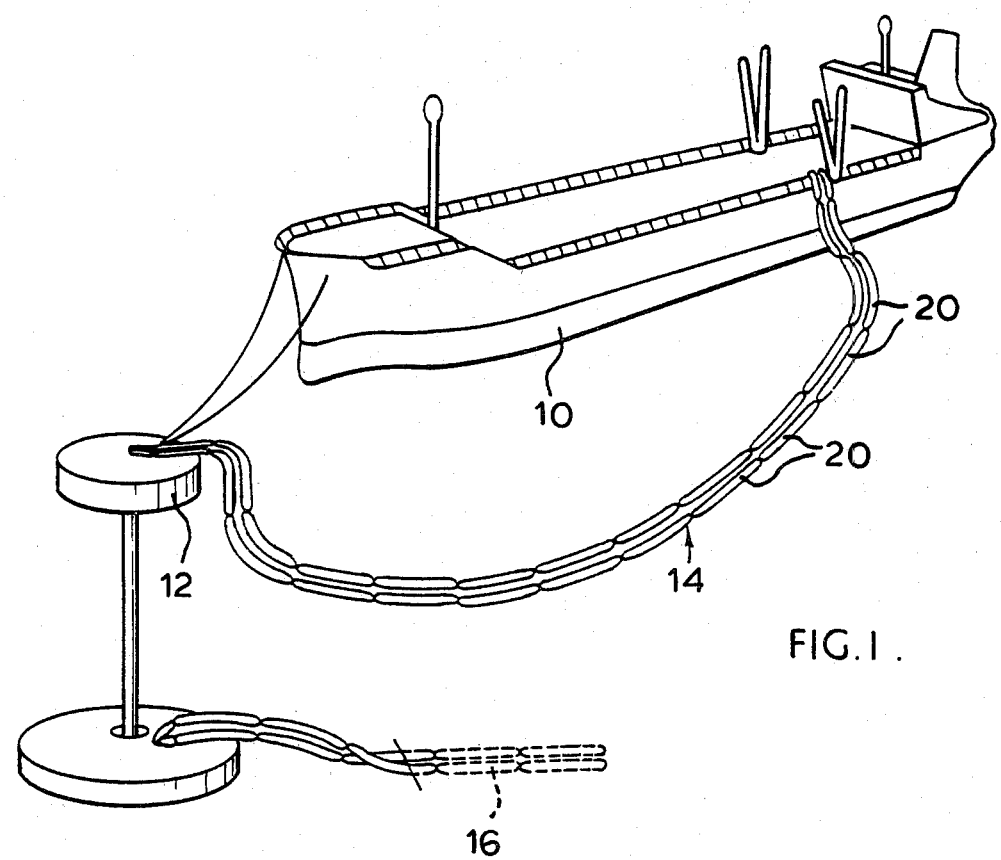
FIG. 1 illustrates a ship moored at a buoy and connected to the buoy by means of an oil transfer pipe built of several flanged hose sections.
Figure 2:
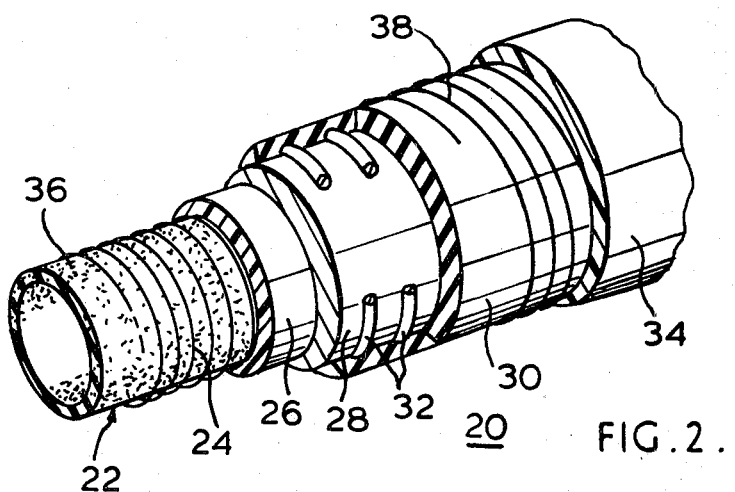

Referring to FIG. 1, there is shown a tanker 10 moored by a buoy 12. Oil is transferred from the tanker 10 to the buoy 12 through an oil transfer pipe 14 which is flexible and which may float in part. The oil is delivered to an onshore station via the submerged pipeline 16. The transfer pipe 14 is formed of individual hose sections 20 which are flanged at each end so that they may be joined together. The hose sections 20 must be flexible and yet capable of withstanding the harsh environment to which they are subjected. The hose sections 20 are of a composite structure and this is illustrated in FIG. 2. Each hose section 20 consists of a high grade synthetic rubber tube 22, a sensing element 24 which is in contact with the outer surface of the tube 22, a textile ply 26 impregnated and coated with synthetic rubber, an overlay 28 of plies of braided high tensile steel cable, a layer of synthetic rubber 30 in which helically wound steel wire 32 is embedded and an outer sheath of wear resistant material 34.

The sensing element 24 should be flexible enough to withstand distortions of the hose section caused by installation, operational manipulation and ambient sea conditions insofar as these do not result in damage to the hose. The flexibility of the sensing element 24 is of greater practical significance when the hose section is not provided with a reinforcing steel wire 32, such hose sections are becoming more common.

The sensing element 24 is comprised of a coil of fine wire wrapped around the tube 22 and connected to a sensing unit 42 which is responsive to a change in the electrical impedance of the coil. This embodiment of the sensing element 24 is particularly useful since it is responsive to the presence of oil between the plies and is also responsive to the deformation of the tube 22. In the event of oil seepage, the inductance of the coil 24 will be changed by virtue of the change in the magnetic properties of the material immediately contacting the coil 24 and in the event of deformation of the tube 22 this will change the inductance of the coil 24 but may additionally cause rupture of the coil 24 resulting in an open circuit. The coil 24 is positioned adjacent the tube 22 in order to provide an early indication that breakdown of the hose section 20 is imminent.

The sensing unit, which is responsive to a change in the electrical impedance of the coil 24, may comprise an inductive bridge circuit in which the inductance of the coil 24 is compared with a reference inductance. Alternatively, the inductance of the coil 24 may form part of a tuned circuit wherein the frequency of oscillation of the tuned circuit will vary in accordance with changes in the inductance of the coil 24. A further alternative is to arrange the inductance of the coil as part of a blocking oscillator circuit in which case the circuit responds when the inductance of the coil 24 reaches a threshold value. The sensing unit may be encapsulated between the plies of the hose.

A signal indicative of the imminent breakdown of the hose section 20 is produced by the coil 24 in combination with the sensing unit to which the coil 24 is connected. This signal is combined with a further signal, produced by additional circuitry, which identifies the specific hose section 20. The combined monitoring signal is relayed to a suitable receiving station 44 from which the entire length of the oil transfer pipe 14 may be kept under surveillance. The combined monitoring signal is preferably relayed to the receiving station by means of radio-transmission. The radio transmitter can be separate from or combined with the sensing unit and additional circuitry, in the case of the combination the circuits can be encapsulated and mounted on a flange at one end of the hose section 20.

Whilst the preferred form of the sensing element 24 is that of a coil of fine wire several advantageous variations exist. The characteristic of the sensing element 24 which is used to monitor the hose and the sensing unit responsive to variations of that characteristic are dependent upon the form of the sensing element and the form or forms of deterioration which are being relied upon to indicate imminent breakdown of the hose section 20.

When the sensing element 24 is primarily intended to be responsive to the seepage of oil between the plies of the hose section 20, the sensing element 24 may comprise several components the capacitance or conductance between which is used to monitor the hose section 20. The sensing element 24 may be in the form of parallel non-touching wires, as shown in FIGS. 2 and 4 which are connected to v sensing unit 42 responsive to a change in the conductance of the material disposed between the individual wires or to a change in the capacitance between the wires. Alternatively, the sensing element may be in the form of conductors printed onto a flexible backing sheet which is wrapped between the plies or may comprise similarly disposed sheets of aluminium foil. A further alternative embodiment of the sensing element 24 is the use of a magnetic tape 40 wrapped around or along the tube 22 as shown in FIG. 3. A radio frequency signal is continuously or periodically transmitted along the magnetic tape with known filtering and detection techniques being employed to determine when the transmission of the signal along the magnetic tape has been affected by the presence of oil between the plies of the hose due to seepage through or rupture of the tube 22.

It is advantageous to dispose particles 36 of a suitable material between the plies of the hose together with the sensing element. These particles become suspended in the fluid which flows between the plies as a result of rupture of the tube 22 and serve to enhance the change in the electromagnetic parameters to which the sensing element responds. The use of particles of carbon black is particularly advantageous in the case of a sensing unit responsive to a change in conductance between the conductors of a sensing element consisting of parallel non-touching wires. Other suitable materials include particles having strong magnetic or conductive properties such as ferrous oxide. Care should be taken to ensure that the adhesion between the plies of the hose is not significantly reduced by the presence of the particles between the plies.

All of the above mentioned forms of the sensing element 24 are also responsive, to varying degrees, to deformation and rupture of the tube 22. Rupture of the tube 22 will result in the sensing element 24 being broken which can be detected and thus used to monitor the hose. When detecting the deformation and rupture of the tube 22 an advantageous embodiment of the sensing element 24 involves the use of a fibre optic element. Rupture of the tube 24 will cause the fibre optic element to break and thus result in the fibre optic element being unable to transmit a signal. The use of a fibre optic element is advantageous due to the material from which it is manufactured and the methods by which it may be coupled to transducers, particularly when compared with the corresponding properties of electrically conducting elements.

Additional monitoring of the hose sections 20 may be provided in order to detect the occurrence of physical damage to the outer plies of the hose. Such damage can be caused by passing vessels sailing over the floating hose 14. The additional monitoring may be effected by the use of a secondary sensing element positioned between the layer of synthetic rubber 30 and the outer sheath 34. The secondary sensing element may take the form of any of the above described variations of the sensing element 24 which, in combination with the respective sensing unit, is capable of detecting changes in characteristics caused by physical damage to the outer plies of a hose section 20. The sensing element may be separate from or a continuation of the sensing element 24. The preferred form of the sensing element is a fibre optic element 38, which will produce an open circuit when damage occurs. Preferably, indication of damage to the outer plies of a hose section 20 is relayed to the receiving station by a unique code used within the signalling system described above.

An additional detection device in the form of a pressure sensitive switch may be provided on the hose sections and is particularly useful when used on the hose section which is unattached at one end when the pipeline is not connected to a tanker. The pressure sensitive switch produces a signal if the free end of the pipeline sinks to a critical depth, that is the depth at which the remainder of the floating hose begins to be dragged below the surface of the sea.

Several variations of the signalling system are possible. Imminent breakdown of the hose section 20 may be signalled solely by a visual signal transmitted from the hose section 20. Monitoring signals may be relayed to the receiving station by cable transmission. The hose sections 20 constituting the oil transfer pipe 14 may be grouped into sets with the transmission of monitoring signals being relayed from each set. The relay of monitoring signals to a receiving station by means of radio transmission may occur by means of several radio links between relay stations, one such relay station may conveniently be positioned on the buoy 12.

The apparatus can be arranged so that the condition of the hose sections 20 are under surveillance, are periodically and/or sequentially inspected or arranged so that a warning signal is produced only when breakdown of a hose section 20 is imminent.

I claim:

1. A hose for transporting fluid having electromagnetic properties, said hose having at least two plies between which fluid normally is not present; a sensing element between the plies and forming part of a detection circuit operable to signal the presence of fluid between the plies as a result of failure of one of the plies; and a particulate material located between the plies, the sensing element being responsive to at least one of the fluid's electromagnetic properties to initiate operation of the said circuit, and the particulate material enhancing the said at least one electromagnetic property of the fluid to which the sensing element is responsive.

2. A fluid transport hose as claimed in claim 1, wherein the sensing element is in the form of a coil of conductive material wound helically around an inner ply of the hose.

3. A fluid transport hose as claimed in claim 1, wherein the sensing element is in the form of non-touching conductive elements.

4. A fluid transport hose as claimed in claim 1, wherein the sensing element is in the form of a magnetic tape.

5. A fluid transport as claimed in any of claims 1, 2, 3, and 4 wherein a secondary sensing element is provided on the surface of an outer ply of the hose, the secondary sensing element being responsive to a rupture of the outer ply.

6. A fluid transport hose as claimed in any of claims 1, 2, 3, and 4 in combination with a sensing unit, the sensing unit producing an output signal upon response of the sensing element to the rupture of an inner ply.

7. A fluid transport hose as claimed in any of claims 1, 2, 3, and 4, in combination with a sensing unit and a monitoring system, wherein the sensing unit produces an output upon response of the sensing element to the rupture of an inner ply and wherein the monitoring system periodically interrogates the sensing unit to determine whether or not an inner ply of the hose has ruptured.

* * * * *